United States Patent
Wen et al.

(10) Patent No.: US 8,160,583 B2
(45) Date of Patent: *Apr. 17, 2012

(54) METHOD AND APPARATUS FOR BEST SERVICE RESCAN SCHEDULING FOR MOBILE DEVICE OPERATING IN AN EVDO HYBRID MODE

(75) Inventors: Zhao Wen, Kanata (CA); Hossain Asif, Kanata (CA); Chaudry Rasul Shahid, Kanata (CA)

(73) Assignee: Research In Motion Limited, Waterloo, ON ( * ) Notice: Subject to any disclaimer, the term of this patent is extended or adjusted under 35 U.S.C. 154(b) by 170 days.

This patent is subject to a terminal disclaimer.

(21) Appl. No.: 12/540,816

(22) Filed: Aug. 13, 2009

(65) Prior Publication Data

US 2009/0298494 A1 Dec. 3, 2009

Related U.S. Application Data

(63) Continuation of application No. 11/127,096, filed on May 12, 2005, now Pat. No. 7,593,727.

(51) Int. Cl.
*H04W 4/00* (2009.01)
(52) U.S. Cl. .................................... 455/434
(58) Field of Classification Search ............ 455/434
See application file for complete search history.

(56) References Cited

U.S. PATENT DOCUMENTS

| | | | |
|---|---|---|---|
| 6,119,003 A * | 9/2000 | Kukkohovi | 455/435.2 |
| 6,751,472 B1 | 6/2004 | Muhonen | |
| 2002/0197991 A1* | 12/2002 | Anvekar et al. | 455/432 |
| 2004/0087305 A1 | 5/2004 | Jiang et al. | |
| 2005/0037755 A1 | 2/2005 | Hind et al. | |
| 2006/0089138 A1* | 4/2006 | Smith et al. | 455/426.1 |
| 2006/0153139 A1* | 7/2006 | Bae et al. | 370/335 |

FOREIGN PATENT DOCUMENTS

WO 2004059858 7/2004

OTHER PUBLICATIONS

"1xEV: 1xEVolution IS-856 TIA/EIA Standard Airlink Overview Rev. 7.2" TIA/EIA/IS-856, Nov. 7, 2001, pp. 1-27, XP002277692.

* cited by examiner

*Primary Examiner* — Steven Lim
(74) *Attorney, Agent, or Firm* — Moffat & Co.

(57) ABSTRACT

A method and apparatus for best service rescan scheduling on a mobile device operating in an EVDO hybrid mode, the method comprising the steps of: blocking a best service rescan on the mobile device if the mobile device in an EVDO traffic state, the mobile device characterized by blocking means, the blocking means enabled to block a best service rescan on the mobile device if the mobile device in an EVDO traffic state.

17 Claims, 3 Drawing Sheets

METHOD AND APPARATUS FOR BEST SERVICE RESCAN SCHEDULING FOR MOBILE DEVICE OPERATING IN AN EVDO HYBRID MODE

RELATED APPLICATIONS

The present application is a continuation of U.S. patent application Ser. No. 11/127,096, filed May 12, 2005, the contents of which are incorporated herein by reference.

FIELD OF THE APPLICATION

The present application relates to a mobile device operated in a hybrid EVDO and CDMA2000 network and, in particular, deals with the scheduling of best service rescan when an EVDO traffic channel exists.

BACKGROUND

The CDMA 1x/EVDO mobile system is a hybrid system that has evolved from the CDMA2000 system. EVDO stands for Evolution Data Only or Data Optimized and as suggested by this, is a data only system. One advantage of EVDO systems is that, it allows a high transfer rate for data. Another advantage of 1XEVDO System operating in hybrid mode is the ability to receive circuit switched services, such as voice calls, even during active data session in EVDO System.

Mobile devices typically include a list, referred to herein as a preferred roaming list, which indicates to the mobile device the preferred networks that the mobile device should be connected to. A preferred roaming list stores information about various networks within a geographic location and indicates to the mobile device which network it should connect to preferably. If a mobile device does not connect to a preferred network but connects to a less preferred network on the preferred roaming list, the mobile device includes a timer which, at the expiration thereof, triggers a rescan on the mobile device to try to acquire a more preferred network. When this is done, the mobile device drops the current network that it is connected to in an attempt to reconnect to a more preferred network.

The dropping of a network is problematic when the mobile device is operating in a CDMA 1x/EVDO system with a traffic channel established. EVDO hybrid systems require that the mobile device first acquire the CDMA system and wait for the CDMA system to be in an idle state before then acquiring the EVDO network. Once the EVDO network is acquired, data is transmitted to the mobile device through the EVDO network and voice and other circuit switched services such as short message service (SMS) use the CDMA system.

In the EVDO hybrid system, the CDMA 1x system takes precedence over the EVDO system. Thus, if ever the CDMA 1x connection is lost, the mobile device will drop any EVDO connection that is established and will attempt to reacquire the CDMA system. The problem with this is if the mobile device is not in a preferred system, the EVDO traffic channel may be dropped at periodic intervals when the best service rescan timer expires. This produces undesirable results since it results in lost data which needs to be resent, thus using up network resources. if the user is paying on a per packet basis, will also cost the user money. It further requires battery resources to establish a traffic channel again once the CDMA 1x system is acquired and the EVDO system is acquired.

BRIEF DESCRIPTION OF THE DRAWINGS

The present method and apparatus will be better understood with reference to the drawings in which.

DETAILED DESCRIPTION OF THE DRAWINGS

Figure 1:
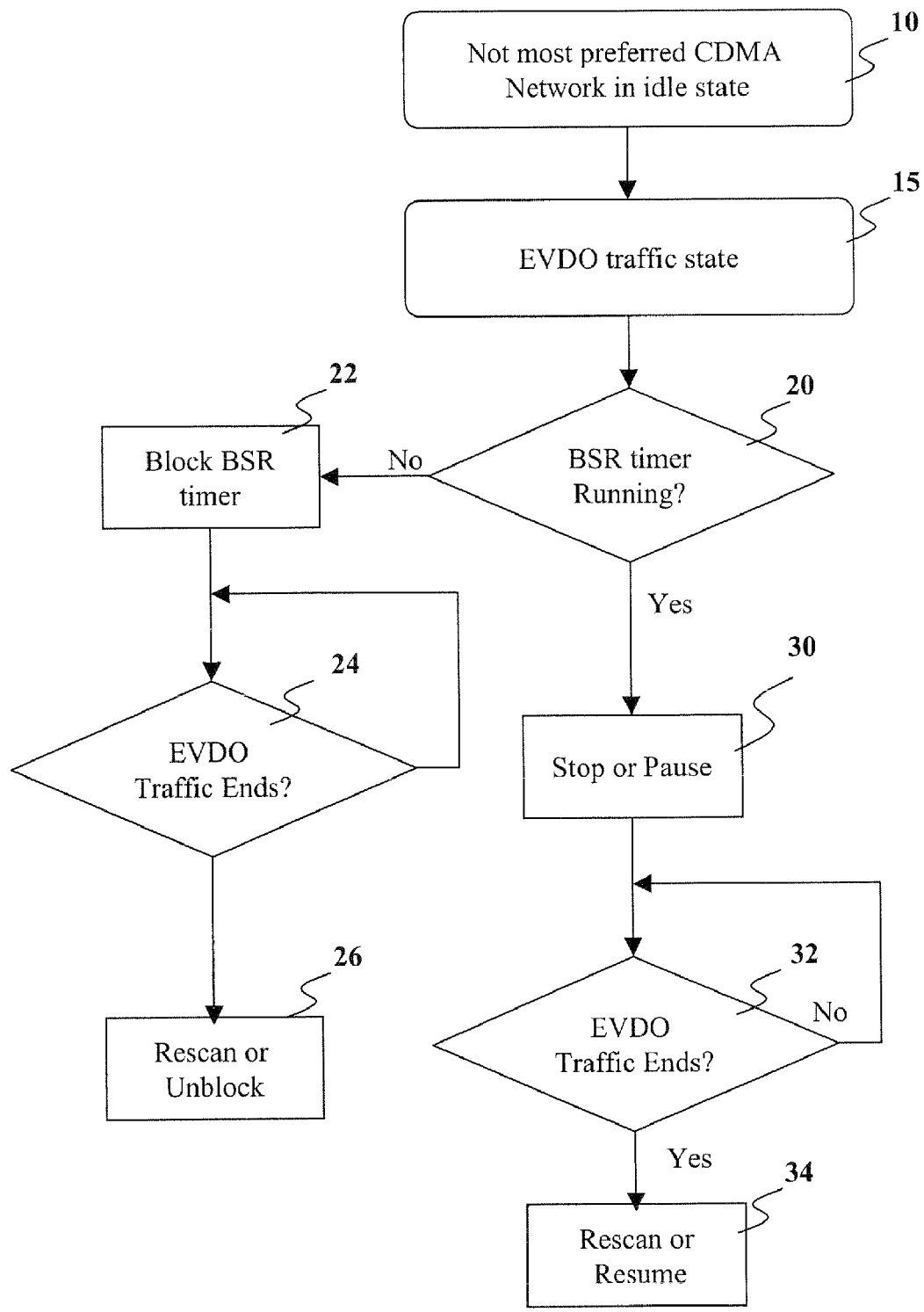
FIG. 1 is a flow chart of a preferred embodiment of the method of best service rescan scheduling.

The present method and apparatus overcome the deficiencies in the prior art by blocking the best service rescan (BSR) reselect until after an EVDO traffic state is completed. Specifically, if an EVDO traffic channel is established, then the device is likely downloading data at the time and, based on this, a better solution than to drop the EVDO channel when the rescan timer expires is to wait until after the traffic ends and the traffic channel is dropped.

In one embodiment, the present method and apparatus perform a check to see whether the CDMA network is the most preferred network and is in an idle state. If the CDMA network is the most preferred network, then no BSR reselect will occur. If the CDMA network is not in an idle state, then the network is likely providing voice or SMS services and thus has preempted any EVDO connection.

If the device is in an idle state and not the most preferred CDMA network, and an EVDO traffic state exists, then the present method and apparatus either block the BSR timer or stop or pause the BSR timer. The choice of what to do with the BSR timer could be made based on whether the timer is already running or not, but other solutions are possible.

Once the traffic state ends, the apparatus and method of the present application either unblock the BSR timer, allow it to restart or perform a rescan immediately after the traffic state ends depending on the situation.

The present application therefore provides a method for best service rescan scheduling on a mobile device operating in an EVDO hybrid mode, the method comprising the steps of: blocking a best service rescan on the mobile device if the mobile device in an EVDO traffic state.

The present application further provides a mobile device operating in an EVDO hybrid mode with improved best service rescan scheduling mobile device characterized by: blocking means, the blocking means enabled to block a best service rescan on the mobile device if the mobile device in an EVDO traffic state.

A mobile device includes a preferred roaming list, the list having a number of fields, including identifiers for networks, the frequency of networks, the geographic locations of the networks, and other data. In typical preferred roaming lists, networks within the same geographic location are sorted by the order of preference.

Carriers prefer that users be on their network as opposed to someone else's network and thus the carrier wants the mobile device to acquire the most preferred network within the geographic location of the mobile device. This could also have benefits to the user, since acquiring a less preferred network might cause the user to incur roaming chargers.

If the mobile device fails to acquire the most preferred network, it will try to acquire the next network in the same geographic location and so on until a network is acquired. However, if the most preferred network is not selected, the mobile device is typically programmed to periodically attempt to acquire the most preferred network again. This can be done by setting a timer for a best service rescan (BSR) at the expiration of which a reselection occurs. The periodic reselection drops the CDMA 1x connection and thus by default also drops the EVDO connection and attempts to acquire a new CDMA network.

Reference is now made to FIG. 1. FIG. 1 shows a flow chart of an exemplary method for BSR reselect. In order for the method to apply, the mobile device must be in state 10 in which the CDMA network currently connected to is not the most preferred CDMA network and further, the CDMA 1x connection is in an idle state. As will be appreciated by those skilled in the art, if the CDMA network is the most preferred network, then no BSR rescan will occur since there is no better network to connect to. Further, as will be appreciated by those skilled in the art, if the CDMA network is not in an idle state, then the CDMA network pre-empts the EVDO network and thus precludes the EVDO from having a traffic state.

A further precondition for the method is that an EVDO traffic state exists in state 15. Again, as will be appreciated by those skilled in the art, if the EVDO network is idle, and therefore the mobile device is neither receiving nor transmitting packet data over the EVDO network, no traffic state will exist. In this case, the consequences of dropping an EVDO connection are not as significant as if an EVDO traffic state exists resulting in lost data if the traffic channel is dropped.

If both states 10 and 15 exist, the mobile device will, at step 20, check to see whether the BSR timer is running. As will be appreciated, once a network is acquired, the mobile device can check the preferred roaming list to determine whether the network that is acquired is the most preferred network. If the mobile device detects that there are more preferred networks within the geographic location of the mobile device, the mobile device may start the BSR timer, at the expiry of which the mobile device will drop the current CDMA 1x system that is acquired and try to establish a connection with a more preferred network. Step 20 therefore could occur either before the BSR timer starts or after the BSR timer starts, and each of these can be in a separate embodiment of the present method.

If, in step 20, the mobile device detects that the BSR timer is not running, then the mobile device at step 22 can block the BSR timer. This blocking could be the prevention of the start of the timer completely or further it could include the blocking of a rescan once the timer expires if the timer is allowed to run.

From step 22, the mobile device proceeds to step 24 in which it checks whether the EVDO state ends. Step 24 continues to loop back on itself until the EVDO traffic state ends, as illustrated in FIG. 1. However, various methods of implementing this would be known to those skilled in the art.

Once the EVDO traffic state ends in step 24, the mobile device proceeds to step 26 in which it can perform a BSR rescan immediately or can unblock the BSR timer and thus allow the BSR timer to start.

If in step 20 the BSR timer is found to be running, the mobile device can proceed to step 30. In step 30 the mobile device can either stop or pause the BSR timer depending on the implementation. If in step 30, the mobile device stops the timer, then the timer will either have to be restarted or a rescan for a more preferred network will have to occur after the EVDO traffic state ends. If the mobile device merely pauses the BSR timer, then the BSR timer can either be resumed at the end of the EVDO traffic state or again a rescan can occur.

From step 30, the mobile device proceeds to step 32 in which it checks whether the EVDO traffic state is ended. If the EVDO traffic state has not ended, step 32 continues to loop back on itself and the implementation of this would be known to those skilled in the art, and could include other means instead of looping, including interrupts.

Once the EVDO traffic state ends, the mobile device proceeds to step 34 in which a rescan or a resumption of the timer occurs.

As will be appreciated, the method of FIG. 1 could be modified in various ways. For example, alternative solutions include allowing the BSR timer to run during the traffic state and if the BSR timer expires while the traffic state is still active, then the mobile device could block the rescan until after the traffic state ends. In any case, the mobile device blocks a rescan triggered by the expiration of a best service rescan timer until after an EVDO traffic state ends.

The result of the above includes reduced network traffic. In the prior art, packets that were sent after the connection was dropped had to be resent. The above avoids or minimizes this since the traffic channel is not dropped periodically for a best service rescan.

Further, in the prior art the mobile device typically experienced lag every time the EVDO channel was dropped. For example, if the BSR timer was trying to establish a connection with the most preferred network but could not, it would drop the EVDO channel periodically. If this occurred, for example, every three minutes, the user would experience a lag at the end of the three minutes during which the mobile device attempted to acquire the most preferred CDMA network. In the case where the most preferred network was again unavailable, a less preferred network was again acquired, causing a repeat of the cycle. This detracted from the user experience and may further have resulted in extra billing due to the increased number of packets being sent to the user. The user of the present method and apparatus will not experience this lag since no data traffic is being received during rescan, and thus the rescan is not noticeable by the user.

Further, since each time the EVDO channel is reestablished, the traffic channel needs to also be reestablished, network usage increases and battery usage also increases if the rescan is not blocked.

The above is especially relevant if the mobile device is being used as a wireless modem for a computer. Since EVDO allows a high-data transfer rate, the mobile device can be used in conjunction with a serial port as a modem for a laptop or other computer. In this case, data may be critical and it will be very undesirable to drop the connection because the mobile device is performing a best service mode rescan.

Figure 2:
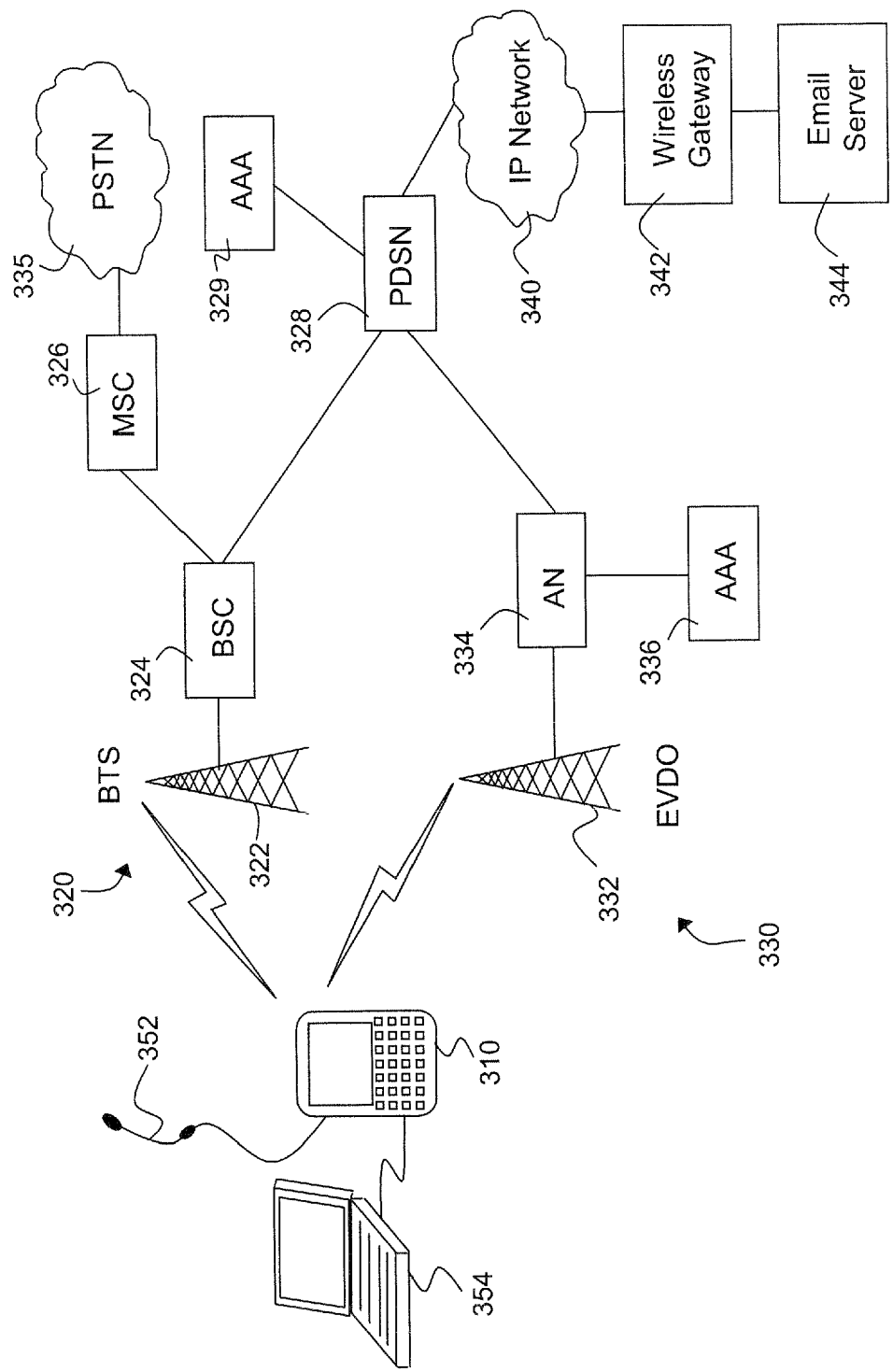
FIG. 2 is a block diagram showing an exemplary EVDO hybrid network.

Reference is now made to FIG. 2. FIG. 2 is a block diagram of an exemplary wireless data network in accordance with the present application and with which the various embodiments of the method of the instant application may cooperate. FIG. 2 shows a block diagram of a wireless data device 310 and exemplary CDMA 1x network 320, an exemplary EVDO network 330, a public switched telephone network (PSTN) 335, a data network 340, wireless gateway 342 and e-mail server 344 with which the instant techniques of this application may cooperate. The wireless data device 310 is preferably a two-way communication device having data and voice communication capabilities.

CDMA network 320 is comprised of a based transceiver station (BTS) 322 and a base station controller (BSC) 324. Base station controller 324 communicates with a mobile switching centre 326 which as will be appreciated, is a circuit switched only component communicating with PSTN 335. Base station controller 324 further communicates with a packet data serving node (PDSN) 328 which is a packet switched only component. PDSN 328 further communicates with IP network 340.

EVDO network 330 contains an EVDO sector 332 which communicates with access node (AN) 334. Since the EVDO network 330 is a data only network, access node 334 communicates only with PDSN 328 and not with any circuit switch components.

An authentication, authorization and accounting node 336 is associated with AN 334, and a similar node 329 is associated with PDSN 328.

Operationally, mobile device 310 communicates wirelessly with CDMA network 320 using BTS 322 and BSC 324 to gain access to the CDMA 1x network. As indicated above, the CDMA 1x network is given priority and the establishment of the CDMA network occurs prior to any EVDO network connection being established.

Mobile device 310 sends and receives both data and voice services through CDMA network 320 until an EVDO network connection with established. Base station controller 324 communicates with circuit switch services provided by MSC 326 such as voice and short message service (SMS) via PSTN 335.

Prior to an EVDO connection being established, mobile device 310 further communicates wirelessly with BTS 322 and BSC 324 to gain access to packet data services provided by PDSN 328, such as e-mail, wireless application protocol (WAP) and other data services via data network 340. Such services are provided through wireless gateway 342 and servers such as e-mail server 344.

Once a network connection is established with CDMA 1x network 320 and the mobile device enters CDMA 1x idle state, wireless device 310 establishes a connection with EVDO network 330. This is done through EVDO sector 332 and AN 334. In this way, mobile device 310 gains access to packet data services provided by PDSN 328 using EVDO network 330. Subsequent to the establishment of an EVDO network connection with mobile device 310, CDMA network 320 is used to provide circuit switched services such as voice and SMS while EVDO network 330 is used to provide packet data services such as e-mail and WAP.

As will be appreciated by those skilled in the art, wireless device 310 can include voice communication means such as a headpiece 350 or a user can communicate directly into the wireless device 310.

A further advantage of the present system is that due to high transfer rates associated with EVDO networks, wireless device 310 can be used as a wireless modem and be connected through various means such as a USB or other serial port, or by short range wireless communications with a computer 354. Computer 354 can then gain access to data network 340 through EVDO network 330 using mobile device 310 as the modem.

Figure 3:
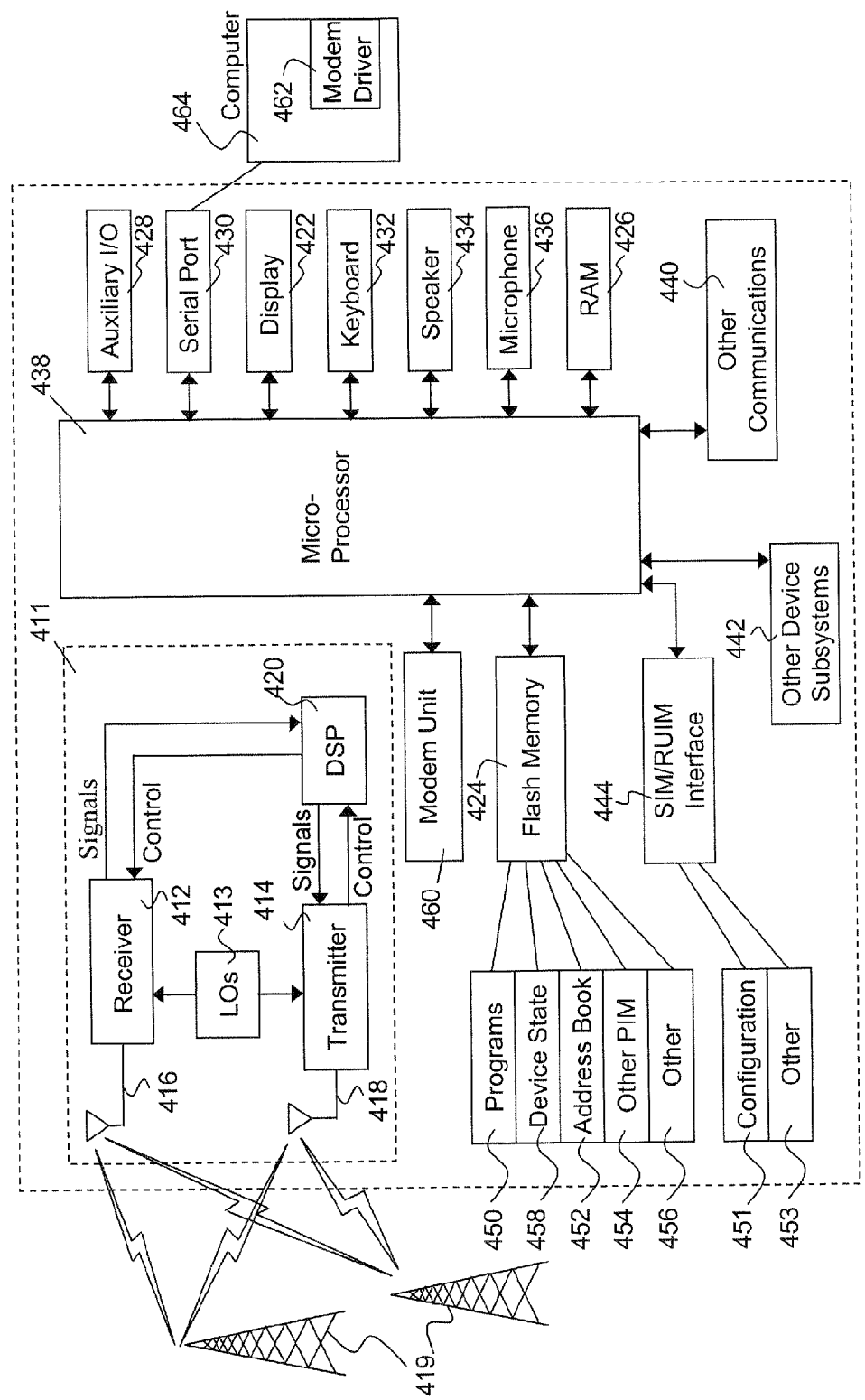
FIG. 3 is a block diagram of an exemplary mobile device that can be used in accordance with the present application.

Reference is now made to FIG. 3. FIG. 3 is a block diagram illustrating a mobile station apt to be used with preferred embodiments of the apparatus and method of the present application. Mobile station 400 is preferably a two-way wireless communication device having at least voice and data communication capabilities. Mobile station 400 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 400 is enabled for two-way communication, it will incorporate a communication subsystem 411, including both a receiver 412 and a transmitter 414, as well as associated components such as one or more, preferably embedded or internal, antenna elements 416 and 418, local oscillators (LOs) 413, and a processing module such as a digital signal processor (DSP) 420. As will be apparent to those skilled in the field of communications, the particular design of the communication subsystem 411 will be dependent upon the communication network in which the device is intended to operate. For example, mobile station 400 may include a communication subsystem 411 designed to operate within the CDMA 1x/EVDO hybrid system.

Network access requirements will also vary depending upon the type of network 419. In some CDMA networks network access is associated with a subscriber or user of mobile station 400. A CDMA mobile station may require a removable user identity module (RUIM) or a subscriber identity module (SIM) card in order to operate on a CDMA network. The SIM/RUIM interface 444 is normally similar to a card-slot into which a SIM/RUIM card can be inserted and ejected like a diskette or PCMCIA card. The SIM/RUIM card can have approximately 64K of memory and hold many key configuration 451, and other information 453 such as identification, and subscriber related information.

When required network registration or activation procedures have been completed, mobile station 400 may send and receive communication signals over the network 419. As illustrated in FIG. 3, network 19 can consist of multiple base stations communicating with the mobile device. For example, in a hybrid CDMA 1x EVDO system, a CDMA base station and an EVDO base station communicate with the mobile station and the mobile station is connected to both simultaneously. The EVDO and CDMA 1x base stations use different paging slots to communicate with the mobile device.

Signals received by antenna 416 through communication network 419 are input to receiver 412, which may perform such common receiver functions as signal amplification, frequency down conversion, filtering, channel selection and the like, and in the example system shown in FIG. 3, analog to digital (A/D) conversion. A/D conversion of a received signal allows more complex communication functions such as demodulation and decoding to be performed in the DSP 420. In a similar manner, signals to be transmitted are processed, including modulation and encoding for example, by DSP 420 and input to transmitter 414 for digital to analog conversion, frequency up conversion, filtering, amplification and transmission over the communication network 419 via antenna 418. DSP 420 not only processes communication signals, but also provides for receiver and transmitter control. For example, the gains applied to communication signals in receiver 412 and transmitter 414 may be adaptively controlled through automatic gain control algorithms implemented in DSP 420.

Mobile station 400 preferably includes a microprocessor 438 which controls the overall operation of the device. Communication functions, including at least data and voice communications, are performed through communication subsystem 411. Microprocessor 438 also interacts with further device subsystems such as the display 422, flash memory 424, random access memory (RAM) 426, auxiliary input/output (I/O) subsystems 428, serial port 430, two or more keyboards or keypads 432, speaker 434, microphone 436, other communication subsystem 440 such as a short-range communications subsystem and any other device subsystems generally designated as 442.

Some of the subsystems shown in FIG. 3 perform communication-related functions, whereas other subsystems may provide "resident" or on-device functions. Notably, some subsystems, such as keyboard 432 and display 422, for example, may be used for both communication-related functions, such as entering a text message for transmission over a communication network, and device-resident functions such as a calculator or task list.

Operating system software used by the microprocessor 438 is preferably stored in a persistent store such as flash memory 424, which may instead be a read-only memory (ROM) or similar storage element (not shown). Those skilled in the art will appreciate that the operating system, specific device applications, or parts thereof, may be temporarily loaded into a volatile memory such as RAM 426. Received communication signals may also be stored in RAM 426.

As shown, flash memory 424 can be segregated into different areas for both computer programs 458 and program data storage 450, 452, 454 and 456. These different storage types indicate that each program can allocate a portion of flash memory 424 for their own data storage requirements. Microprocessor 438, in addition to its operating system functions, preferably enables execution of software applications on the mobile station. A predetermined set of applications that control basic operations, including at least data and voice communication applications for example, will normally be installed on mobile station 400 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 419. In a preferred embodiment, the PIM data items are seamlessly integrated, synchronized and updated, via the wireless network 419, with the mobile station user's corresponding data items stored or associated with a host computer system. Further applications may also be loaded onto the mobile station 400 through the network 419, an auxiliary I/O subsystem 428, serial port 430, short-range communications subsystem 440 or any other suitable subsystem 442, and installed by a user in the RAM 426 or preferably a non-volatile store (not shown) for execution by the microprocessor 438. Such flexibility in application installation increases the functionality of the device and may provide enhanced on-device functions, communication-related functions, or both. For example, secure communication applications may enable electronic commerce functions and other such financial transactions to be performed using the mobile station 400.

In a data communication mode, a received signal such as a text message or web page download will be processed by the communication subsystem 411 and input to the microprocessor 438, which preferably further processes the received signal for output to the display 422, or alternatively to an auxiliary I/O device 428. A user of mobile station 400 may also compose data items such as email messages for example, using the keyboard 432, which is preferably a complete alphanumeric keyboard or telephone-type keypad, in conjunction with the display 422 and possibly an auxiliary I/O device 428. Such composed items may then be transmitted over a communication network through the communication subsystem 411.

For voice communications, overall operation of mobile station 400 is similar, except that received signals would preferably be output to a speaker 434 and signals for transmission would be generated by a microphone 436. Alternative voice or audio I/O subsystems, such as a voice message recording subsystem, may also be implemented on mobile station 400. Although voice or audio signal output is preferably accomplished primarily through the speaker 434, display 422 may also be used to provide an indication of the identity of a calling party, the duration of a voice call, or other voice call related information for example.

Serial port 430 in FIG. 3, would normally be implemented in a personal digital assistant (PDA)-type mobile station for which synchronization with a user's desktop computer (not shown) may be desirable, but is an optional device component. Such a port 430 would enable a user to set preferences through an external device or software application and would extend the capabilities of mobile station 400 by providing for information or software downloads to mobile station 400 other than through a wireless communication network. The alternate download path may for example be used to load an encryption key onto the device through a direct and thus reliable and trusted connection to thereby enable secure device communication. As will be appreciated by those skilled in the art, serial port 430 can further be used to connect the mobile device to a computer to act as a modem. A modem unit 460 interacts with a driver 462 in a computer 464 to allow data transfer through the mobile device. With EVDO networks, a high rate of data transfer can be achieved using the mobile device 400 as the modem.

Other communications subsystems 440, such as a short-range communications subsystem, is a further optional component which may provide for communication between mobile station 400 and different systems or devices, which need not necessarily be similar devices. For example, the subsystem 440 may include an infrared device and associated circuits and components or a Bluetooth™ communication module to provide for communication with similarly enabled systems and devices.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method for best service rescan scheduling on a mobile device communicating on a first network connection and a second network connection, the second network connection being dependent upon the first network connection being active and in an idle mode, the device having a preferred roaming list and a best service rescan function for triggering a rescan to acquire a preferred network if the device is not connected to the preferred network in said preferred roaming list, the method comprising:
   determining if the device is connected to the preferred network;
   determining if the second network connection is in a traffic state; and
   if the second network connection is in the traffic state and the device is not connected to the preferred network, delaying the best service rescan on the mobile device while the second network connection is determined to be in the traffic state, said delaying configured to prevent dropping of the second network connection by the device as a result of the best service rescan.

2. The method of claim 1, wherein the delaying step includes:

checking whether a best service rescan timer is running when entering a second network connection traffic state; and if the best service rescan timer is running, pausing the best service rescan timer.

3. The method of claim 2, further comprising the step of restarting the best service rescan timer when the second network connection traffic state ends.

4. The method of claim 1, wherein the delaying step includes:

checking whether a best service rescan timer is running when entering a second network connection traffic state; and if the best service rescan timer is running, stopping the best service rescan timer.

5. The method of claim 4, further comprising the step of performing a best service rescan when the second network connection traffic state ends.

6. The method of claim 1, wherein the delaying step includes:

checking whether a best service rescan timer is running when entering a second network connection traffic state; and if a best service rescan timer is not running, blocking the best service rescan timer from starting.

7. The method of claim 6, further comprising the step of performing the best service rescan when the second network connection traffic state ends.

8. The method of claim 1, wherein the delaying step includes:

allowing a best service rescan timer to continue running; and if the best service rescan timer expires while the mobile device is in the second network connection traffic state, preventing the mobile device from performing the best service rescan until the second network connection traffic state ends.

9. A mobile device for communication on a first network connection and a second network connection, the second network connection being dependent on the first network connection being established and in an idle mode, the device having improved best service rescan scheduling, including a preferred roaming list and a best service rescan function for triggering a rescan to acquire a preferred network if the device is not connected to the preferred network in said preferred roaming list, the mobile device comprising:

a rescan subsystem configured to:

determine if the device is connected to the preferred network;

determine if the second network connection is in a traffic state; and if the second network connection is in the traffic state and the device is not connected to the preferred network, delay the best service rescan on the mobile device while the second network connection is determined to be in the traffic state, said delaying configured to prevent dropping of the second network connection by the device as a result of the best service rescan.

10. The mobile device of claim 9, the rescan subsystem further configured to check whether a best service rescan timer is running when entering a second network connection traffic state; and if a best service rescan timer is running, pausing the best service rescan timer.

11. The mobile device of claim 10, further comprising restarting the best service rescan timer when the second network connection traffic state ends.

12. The mobile device of claim 9, further configured to check whether a best service rescan timer is running when entering a second network connection traffic state; and if a best service rescan timer is running, stop the best service rescan timer.

13. The mobile device of claim 12, further configured to perform a best service rescan when the second network connection traffic state ends.

14. The mobile device of claim 9, further configured to check whether a best service rescan tinier is running when entering a second network connection traffic state; and if a best service rescan timer is not running, the blocking the best service rescan timer from starting.

15. The mobile device of claim 14, further configured to perform a best service rescan when the second network connection traffic state ends.

16. The mobile device of claim 9, further configured to stop a best service rescan if the best service rescan timer expires while the mobile device is in the second network connection traffic state.

17. The mobile device of claim 16, further configured to perform a best service rescan when the second network connection traffic state ends.

* * * * *